United States Patent
Liu et al.

(10) Patent No.: US 8,456,764 B2
(45) Date of Patent: Jun. 4, 2013

(54) PROJECTION LENS

(75) Inventors: Xiao-Na Liu, Guangdong (CN);
Fang-Ying Peng, New Taipei (TW);
Hai-Jo Huang, New Taipei (TW);
An-Tze Lee, New Taipei (TW);
Sheng-An Wang, New Taipei (TW)

(73) Assignees: Premier Image Technology(China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 74 days.

(21) Appl. No.: 13/179,574

(22) Filed: Jul. 11, 2011

(65) Prior Publication Data
US 2012/0314303 A1     Dec. 13, 2012

(30) Foreign Application Priority Data
Jun. 9, 2011   (CN) .......................... 2011 1 0154010

(51) Int. Cl.
*G02B 13/04* (2006.01)
*G02B 3/02* (2006.01)
*G02B 13/18* (2006.01)
*G02B 9/04* (2006.01)

(52) U.S. Cl.
USPC ............................ 359/753; 359/717; 359/793

(58) Field of Classification Search
USPC ................. 359/713–717, 749–756, 761, 763, 359/770, 771, 781–784, 793
See application file for complete search history.

(56) References Cited

U.S. PATENT DOCUMENTS
7,697,220 B2 * 4/2010 Iyama ........................... 359/753

FOREIGN PATENT DOCUMENTS
CN          101414049          4/2009

* cited by examiner

*Primary Examiner* — Darryl J Collins
(74) *Attorney, Agent, or Firm* — Altis Law Group, Inc.

(57) ABSTRACT

A projection lens includes, in order from the magnification end to the minimization end thereof: a first lens group of a negative refractive power; and a second lens group of a positive refractive power. The projection lens satisfies the formula: $0.061 < F/L < 0.078$; where F represents the effective focal length of the projection lens and L represent the total length of the projection lens.

20 Claims, 3 Drawing Sheets

PROJECTION LENS

BACKGROUND

1. Technical Field

The present disclosure relates to lenses and, particularly, to a lens for a projector having a wide angle of projection, a reduced total length, and a high resolution.

2. Description of Related Art

To obtain small projectors which provide a large, high quality image, a projector with a lens that has a wide projection angle, a short total length, and with a high resolution capability is desired.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
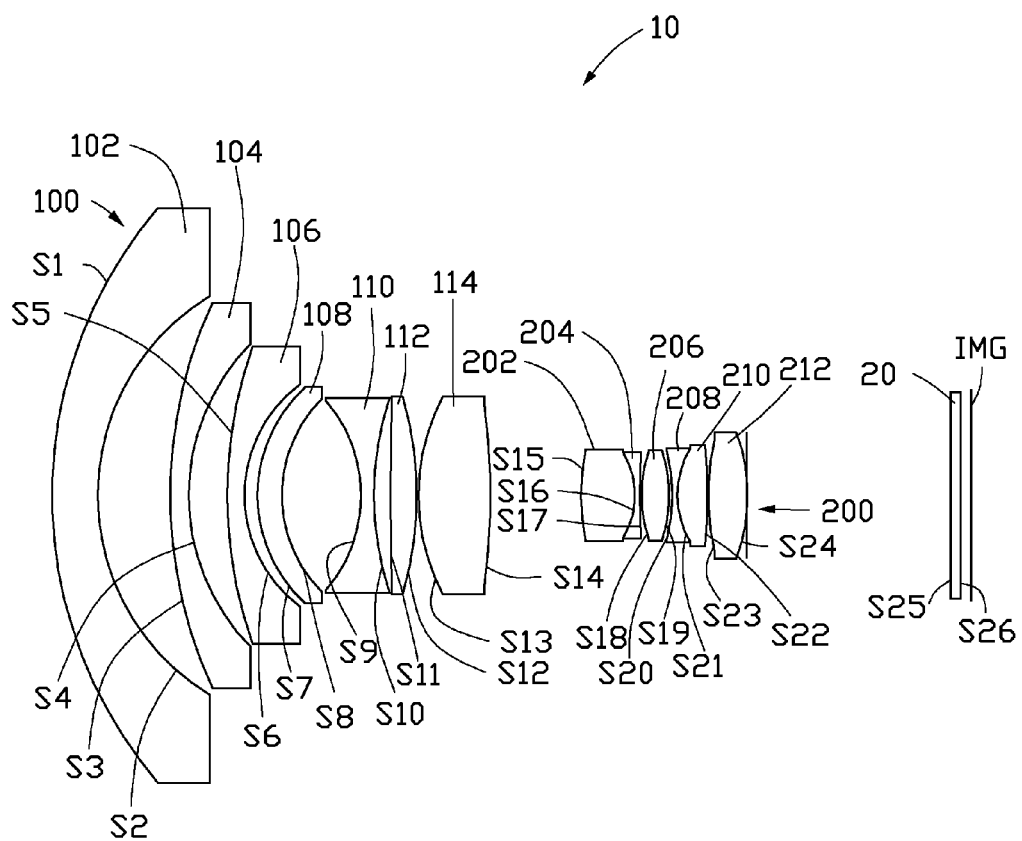
FIG. 1 is a schematic view of a projection lens, according to an embodiment.

Referring to FIG. 1, a lens for a projector (projection lens 10), according to an embodiment, is used in a digital light processing (DLP) projector (not shown). The DLP projector includes a digital micro-mirror device (DMD, not shown), functioning as a spatial light modulator (SLM). The projection lens 10 includes, in order from the screen end (adjacent to the screen, that is, the magnification end) to the DMD end (adjacent to the DMD, that is, the minimization end), a first lens group 100 of a negative refractive power and a second lens group 200 of a positive refractive power. The projection lens 10 satisfies the formula:

$$0.061 < F/L < 0.078;$$

where F represents the effective focal length of the projection lens 10, and L represents the total length of the projection lens 10 (the distance from the first surface S1 of the projection lens 10 at the magnification end to the image plane IMG of the projection lens 10—see below).

If 0.061>F/L is true (that is, 0.061<F/L is false), the total length of the projection lens 10 may not be efficiently reduced and the angle of projection of the projection lens 10 may be limited. However, if the total length of the projection lens 10 is over-reduced, that is to say that the statement F/L>0.078 is true, the total refractive power of the projection lens 10 cannot be reasonably distributed between the first lens group 100 and the second lens group 200, and aberrations can not be effectively controlled in the projection lens 10, decreasing the image quality of the projection lens 10.

The projection lens 10 also satisfies the formula:

$$-2.4 < F1/F2 < -2.0;$$

where F1 is the effective focal length of the first lens group 100 and F2 is the effective focal length of the second lens group 200. Thus, the rear focal length of the projection lens 10 (the distance from the last surface S24 of the projection lens 10 to the image plane IMG of the projection lens 10) can be efficiently increased, to reserve a sufficiency of space between the projection lens and the DMD for installing other elements of the DLP projector therein.

The first lens group 100 includes, in order from the magnification end to the minimization end, a first lens 102, a second lens 104, a third lens 106, a fourth lens 108, a fifth lens 110, a sixth lens 112, and a seventh lens 114. Accordingly, the first lens group 100 includes, in order from the magnification end to the minimization end, surfaces S1-S14.

The first lens 102 has a diameter larger than 60 mm to increase the angle of projection of the projection lens. The first lens 102 can be plastic and made by injection molding. In this case, the projection lens 10 can further satisfy the formula:

$$RI1 < 3;$$

where RI1 is a ratio of the largest width to the smallest width of the first lens 102 along the optical axis of the projection lens 10. By satisfying this formula, the first lens 10 can be readily made by injection molding.

The fourth lens 108 can also be plastic. To increase the image quality of the projection lens 10, the first lens 102 and the fourth lens 108 can be aspherical.

The second lens group 200 includes, from the magnification end to the minimization end, a eighth lens 202, a ninth lens 204, a tenth lens 206, an eleventh lens 208, a twelfth lens 210, and a thirteenth lens 212. The eighth lens 202 and the ninth lens 204 are combined together by adhesive. The eleventh lens 208 and the twelfth lens 210 are also combined together by adhesive. Accordingly, the second lens group 200 includes, in order from the magnification end to the minimization end, surfaces S15-S24.

To increase the image quality of the projection lens 10, the thirteenth lens 212 can be an aspherical glass lens.

The DMD is placed in alignment with the image plane IMG of the projection lens 10 and is covered by a protective glass 20. The protective glass 20 has a surface S25 facing the projection lens 10 and a surface S26 facing away the projection lens 10. When projecting images, light rays are modulated by the DMD and reflected off at the image plane IMG by the DMD. Then, the light rays are transmitted through the protective glass 20, the second lens group 200, the first lens group 100, and finally strike the screen.

The aspherical surface is shaped according to the formula:

$$x = \frac{ch^2}{1 + \sqrt{1 - (k+1)c^2h^2}} + \sum A_i h^i,$$

where h is a height from the optical axis of the projection lens 10 to the aspherical surface, c is a vertex curvature, k is a conic constant, and Ai is the i-th order correction coefficient of the aspherical surface.

The following symbols are used:

$F_{No}$: F number;
$2\omega$: field angle;
R: radius of curvature;
D: distance between surfaces on the optical axis of the projection lens 10;
Nd: refractive index of lens of d light (wavelength: 587.6 nm);
Vd: Abbe number of d light (wavelength: 587.6 nm);
PL: projection distance (the distance from the first surface S1 to the screen); and
BFL: the rear focal length of the projection lens 10.

The projection lens 10 satisfies Tables 1-3.

TABLE 1

| Surface | R(mm) | D(mm) | Nd | Vd |
|---|---|---|---|---|
| S1 | −508.4628 | 4.78 | 1.525279 | 55.95076 |
| S2 | 22.473 | 7.5859 | — | — |
| S3 | 48.5448 | 1.9267 | 1.846663 | 23.7848 |
| S4 | 22.7058 | 4.0303 | — | — |
| S5 | 47.3721 | 1.7692 | 1.568882 | 62.9518 |
| S6 | 14.4793 | 1.378 | — | — |
| S7 | 22.9313 | 2.5584 | 1.607265 | 26.6466 |
| S8 | 21.3923 | 8.2923 | — | — |
| S9 | −15.2335 | 1.312 | 1.496997 | 81.608379 |
| S10 | 31.8029 | 1.7422 | — | — |
| S11 | 442.136 | 2.7459 | 1.805181 | 25.45643 |
| S12 | −38.0691 | 0.1723 | — | — |
| S13 | 22.2031 | 7.5543 | 1.59551 | 39.1794 |
| S14 | −67.9256 | 9.4496 | — | — |
| S15 | 24.7114 | 5.6374 | 1.523073 | 58.64 |
| S16 | −8.7947 | 0.53 | 1.8348 | 42.72067 |
| S17 | 125.8937 | 0.1797 | — | — |
| S18 | 14.8533 | 2.8606 | 1.59551 | 39.179 |
| S19 | −14.9614 | 0.3301 | — | — |
| S20 | −20.2317 | 0.54 | 1.801004 | 34.967 |
| S21 | 9.6393 | 3.14 | 1.487489 | 70.441164 |
| S22 | −56.2764 | 0.0917 | — | — |
| S23 | 32.3994 | 4.1226 | 1.497103 | 81.55958 |
| S24 | −14.3817 | 21.2126 | — | — |
| S25 | Infinity | 1.05 | 1.5168 | 64.167336 |
| S26 | Infinity | 1.1 | — | — |
| IMG | Infinity | — | — | — |

TABLE 2A

| | S1 | S2 | S7 |
|---|---|---|---|
| k | 0 | 0 | 0 |
| A4 | 1.84452e−5 | −2.740758e−5 | 1.55098e−4 |
| A6 | 3.8969759e−9 | 1.96457e−7 | 4.76688e−7 |
| A8 | −4.156304e−11 | −1.10146e−10 | −2.711809e−9 |
| A10 | 3.76177e−14 | −1.8478e−12 | −1.846338e−11 |
| A12 | 4.255158e−17 | 4.08194e−15 | −1.05529e−13 |
| A14 | −8.673124e−20 | −1.68406e−18 | 1.402946e−18 |
| A16 | 4.1814714e−23 | −2.61457e−21 | 4.003488e−18 |

TABLE 2B

| | S8 | S23 | S24 |
|---|---|---|---|
| k | 0 | 9.6548 | 0 |
| A4 | 2.0515958e−4 | 2.609278e−5 | 1.70005004e−4 |
| A6 | 3.2798852e−7 | 4.8770310e−7 | −3.5921082e−6 |
| A8 | −1.4012442e−9 | 3.936323e−8 | 3.0429385e−7 |
| A10 | −6.1800932e−11 | −2.1622675e−10 | −8.9582332e−9 |
| A12 | −4.1146619e−13 | −7.0692107e−11 | 1.0963808e−10 |
| A14 | 4.2128063e−15 | 2.964878e−12 | 4.275925e−13 |
| A16 | −5.0116886e−19 | −3.4508637e−14 | −1.3636601e−14 |

TABLE 3

| F (mm) | $F_{No}$ | PL (mm) | F1 (mm) | F2 (mm) | L (mm) | BFL (mm) | RI1 | 2ω (°) |
|---|---|---|---|---|---|---|---|---|
| 6.88 | 2.6 | 1000 | −52.937 | 23.432 | 96 | 23.36 | 2.95 | 115.76 |

Figure 2:
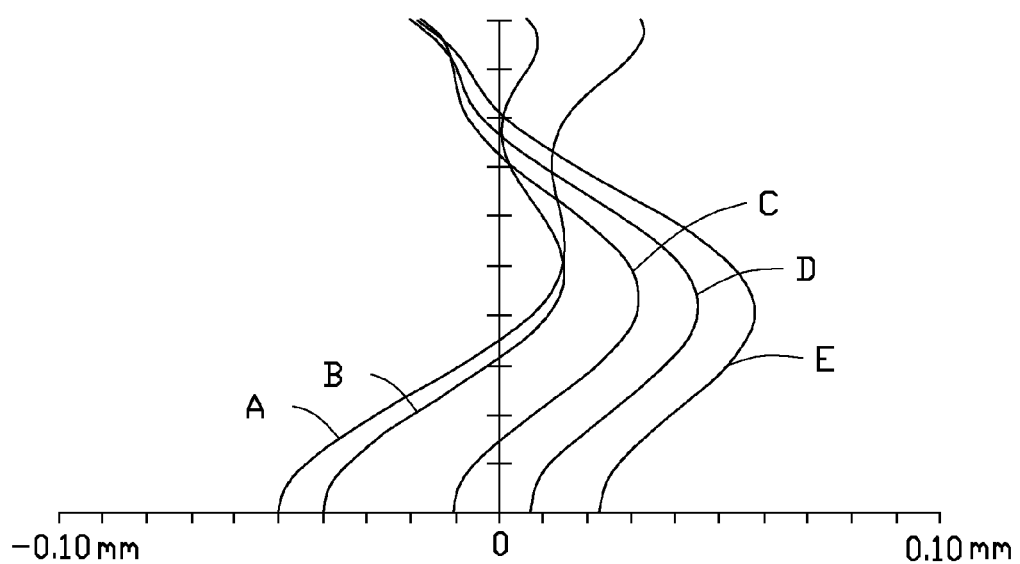
FIGS. 2-3 are graphs respectively showing spherical aberration and distortion in the projection lens, according to the embodiment.
Figure 3:
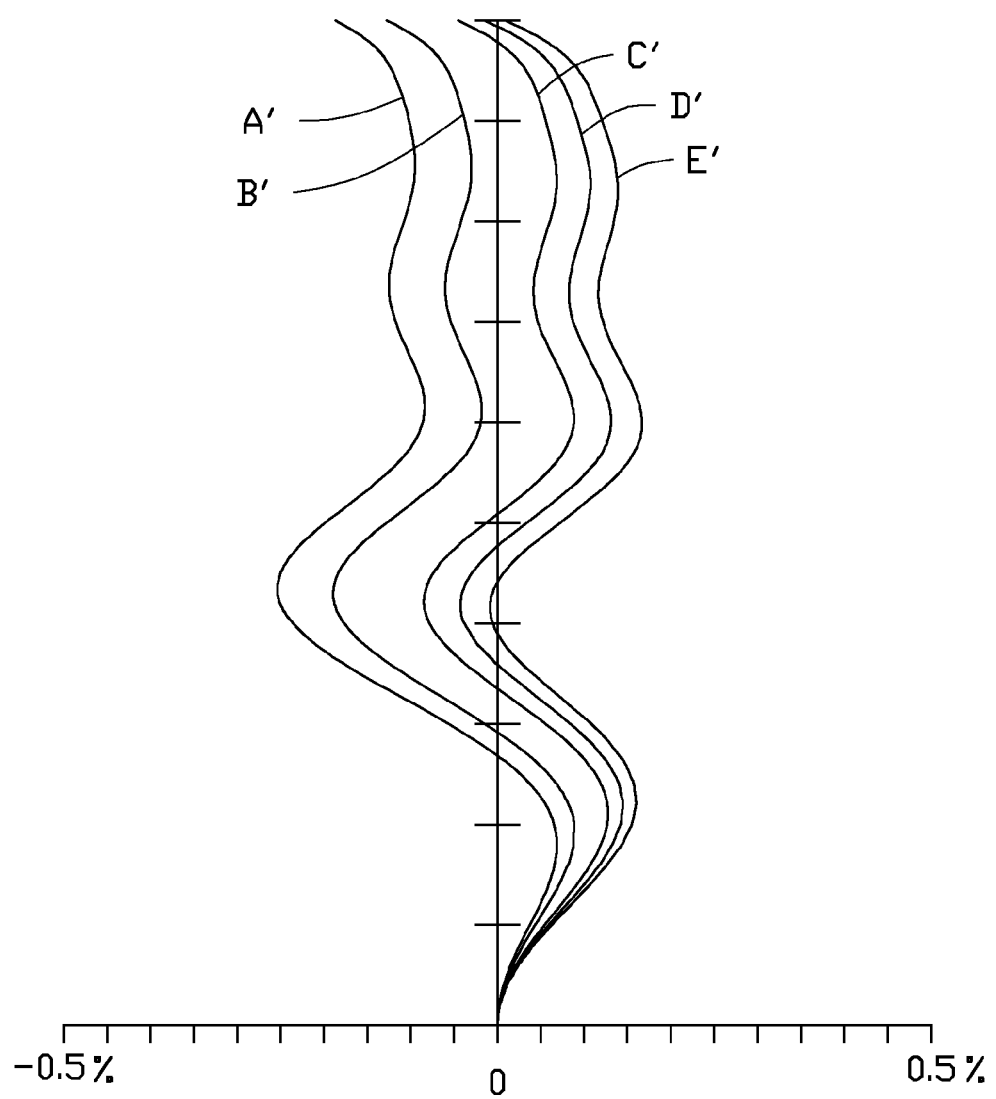

As illustrated in FIG. 2, the curves A, B, C, D, and E are, respectively, the spherical aberration characteristic curves of light rays of wavelengths 450 nm, 480 nm, 550 nm, 590 nm and 630 nm. Obviously, a spherical aberration of visible light (400-700 nm) occurring in the projection lens 10 is limited to a range of: −0.1 mm-0.1 mm. In FIG. 3, the curves A', B', C', D', and E' are, respectively, the distortion characteristic curves of the light rays of wavelengths 450 nm, 480 nm, 550 nm, 590 nm and 630 nm. Obviously, the distortion of visible light (400-700 nm) occurring in the projection lens 10 is limited to a range of: −0.5%-0.5%.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A projection lens, in this order from the magnification end to the minimization end thereof, comprising:
    a first lens group of a negative refractive power; and
    a second lens group of a positive refractive power,
    wherein the projection lens satisfies the formula: $0.061<F/L<0.078$, where F represents the effective focal length of the projection lens and L represent the total length of the projection lens;
    wherein the projection lens also satisfies the following formula: $-2.4<F1/F2<-2.0$; where F1 is the effective focal length of the first lens group, and F2 is the effective focal length of the second lens group.

2. The projection lens of claim 1, wherein the first lens group comprises, in this order from the magnification end to the minimization end of the projection lens, a first lens, a second lens, a third lens, a fourth lens, a fifth lens, a sixth lens, and a seventh lens.

3. The projection lens of claim 2, wherein the first lens has a diameter larger than 60 mm.

4. The projection lens of claim 3, wherein the first lens is a plastic lens.

5. The projection lens of claim 4, wherein the first lens is made by injection molding.

6. The projection lens of claim 5, wherein the projection lens satisfies the following formula: $RI1<3$; where RI1 is a ratio of the largest width to the smallest width of the first lens along the optical axis of the projection lens.

7. The projection lens of claim 2, wherein the fourth lens is a plastic lens.

8. The projection lens of claim 2, wherein the first lens and the fourth lens are aspherical lenses.

9. The projection lens of claim 1, wherein the second lens group comprises, in this order from the magnification end to the minimization end of the projection lens, a eighth lens, a ninth lens, a tenth lens, a eleventh lens, a twelfth lens, and a thirteenth lens, the eighth lens and the ninth lens are combined together by adhesive, and the eleventh lens and the twelfth lens are combined together by adhesive.

10. The projection lens of claim 9, wherein the thirteenth lens is an aspherical glass lens.

11. A projection lens, in this order from the magnification end to the minimization end thereof, comprising:
    a first lens group of a negative refractive power; and
    a second lens group of a positive refractive power,
    wherein the projection lens satisfies the formula: $0.072 \leqq F/L<0.078$, where F represents the effective focal length of the projection lens and L represent the total length of the projection lens.

12. The projection lens of claim 11, wherein the projection lens also satisfies the following formula: $-2.4<F1/F2<-2.0$; where F1 is the effective focal length of the first lens group, and F2 is the effective focal length of the second lens group.

13. The projection lens of claim 11, wherein the first lens group comprises, in this order from the magnification end to the minimization end of the projection lens, a first lens, a second lens, a third lens, a fourth lens, a fifth lens, a sixth lens, and a seventh lens.

14. The projection lens of claim 13, wherein the first lens has a diameter larger than 60 mm.

15. The projection lens of claim 14, wherein the first lens is a plastic lens.

16. The projection lens of claim 15, wherein the first lens is made by injection molding.

17. The projection lens of claim 16, wherein the projection lens satisfies the following formula: RI1<3; where RI1 is a ratio of the largest width to the smallest width of the first lens along the optical axis of the projection lens.

18. The projection lens of claim 13, wherein the fourth lens is a plastic lens.

19. The projection lens of claim 13, wherein the first lens and the fourth lens are aspherical lenses.

20. The projection lens of claim 11, wherein the second lens group comprises, in this order from the magnification end to the minimization end of the projection lens, a eighth lens, a ninth lens, a tenth lens, a eleventh lens, a twelfth lens, and a thirteenth lens, the eighth lens and the ninth lens are combined together by adhesive, and the eleventh lens and the twelfth lens are combined together by adhesive.

* * * * *